April 21, 1931.    L. CAMPBELL, JR    1,802,002
VALVE STRUCTURE
Filed April 26, 1926
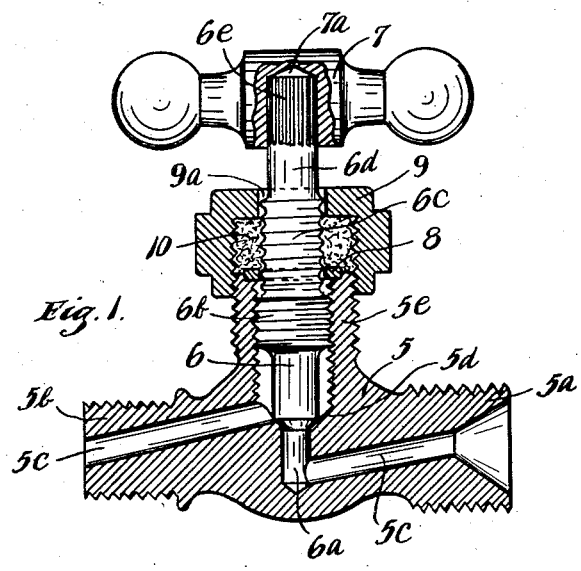
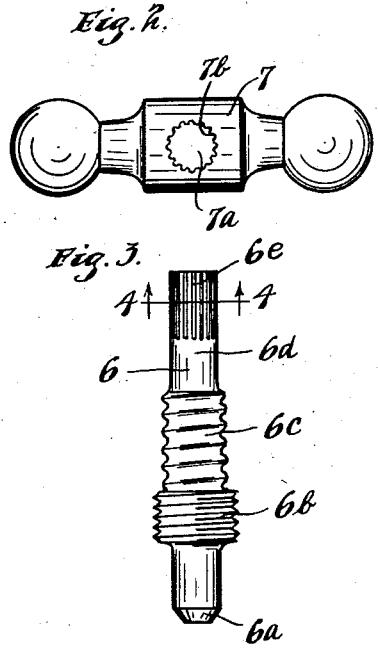
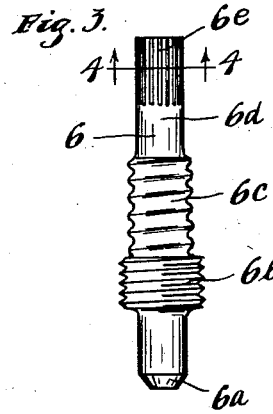
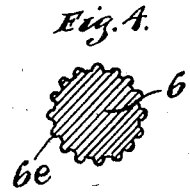
INVENTOR.
LORN CAMPBELL JR.
BY HIS ATTORNEYS.

Patented Apr. 21, 1931

1,802,002

UNITED STATES PATENT OFFICE

LORN CAMPBELL, JR., OF MINNEAPOLIS, MINNESOTA, ASSIGNOR TO THE HARRIS CALORIFIC COMPANY, OF CLEVELAND, OHIO, A CORPORATION OF OHIO

VALVE STRUCTURE

Application filed April 26, 1926. Serial No. 104,542.

This invention relates to a valve structure, one of the features thereof being the method and structure of connecting the usual valve handle with the valve stem, and it may be stated that this method and structure is applicable to other similar members.

It has heretofore been the practice to connect the valve handle to the stem by having the stem pass through an aperture in the handle and then driving a pin transversely through the stem and handle, or to provide the stem with a square or angular end which was forced into a similar aperture in the handle. With the latter structure the handle eventually loosens on the stem due to the frequent turning thereof and the handle often comes off the stem. When the handle and stem are secured by a pin, the strength of the stem is considerably weakened and the same is sometimes broken off.

It is also the common practice to have the valve stem provided with threads by means of which it is drawn to its seat. With the valves used for controlling the flow of gases, particularly gases at high pressure, such as are used with acetylene torches, it is practically impossible to have the threads so tight but that any exterior pressure lengthwise of the valve stem as when it contacts or is struck against some object, will vary the position of the valve relatively to its seat. With such torches as mentioned, the flame is adjusted to a certain desired point by proportionately adjusting the supply of oxygen and acetylene. The adjustment is very critical and if the valves can be moved ever so slightly by exterior pressure on the valve stem, the desired character of the flame is changed.

It is an object of this invention, therefore, to provide a simple and efficient method and structure for connecting the valve stem to the valve handle.

It is more specifically an object of the invention rigidly and permanently to connect a valve stem and handle or any member and a cylindrical shaft or stem by forming an opening in the handle in which the stem substantially fits, then broaching the stem and aperture to form longitudinal scratches or fine grooves therein and then forcing the stem into the aperture.

It is also an object of the invention to provide means for preventing longitudinal movement of the valve stem when any ordinary pressure occurs longitudinally thereof.

It is still another object of the invention to provide the stem with a helical groove forming a plurality of smooth corrugations together with means such as packing, adapted to be pressed against the stem and into said groove or against said corrugations to prevent longitudinal movement of the stem.

These and other objects and advantages of the invention will be fully set forth in the following description made in connection with the accompanying drawings, in which like reference characters refer to similar parts throughout the several views and in which:—

Fig. 1 is a vertical central section through the valve, a part of the handle being shown in front elevation;

Fig. 2 is a bottom plan view of the handle removed;

Fig. 3 is a view in front elevation of the stem removed; and,

Fig. 4 is a horizontal section taken on line 4—4 of Fig. 3, as indicated by the arrows.

Referring to the drawings, a valve is shown comprising the valve body 5 having laterally and oppositely projecting portions 5a and 5b which are threaded to receive the usual pipe connections for the valve. The valve has the customary passage 5c extending therethrough and the beveled valve seat 5d is formed at the central part of passage 5c. The valve has the neck or upwardly extending portion 5e which is bored to form a chamber extending to the seat 5d and is interiorly threaded. The valve stem 6 is provided at its end with a beveled portion 6a adapted to contact the seat 5d and close the opening 5c when the valve is in its closing or shut off position. The stem 6 also has a threaded portion 6b adapted to engage the threads on the interior of portion 5e. In accordance with the present invention the stem is also provided above the threaded portion 6b, with a helical groove 6c. This groove is coarser than the threads 6b, but has the same inclination or lead as said threads and as shown in Fig. 1, the ridges between the convolutions of said groove are not sharp, but rounded. This groove forms a plurality of small corrugations or projections on said stem of greater spacing than the threads on said stem. The stem 6 also has the end portion 6d which is received in the handle 7. The upper end of the valve body 5 and its portion 5e are slightly recessed to receive a small washer 8 and a packing cap 9 is threaded onto the upper end of portion 5e having an opening 9a therethrough adapted to receive the valve stem 6. The packing material 10 is disposed within the cap 9 above the washer 8 and about the stem 6 and specifically the portion 6c of the stem.

To secure the end portion of the stem 6 to the handle 7 the stem is turned to a certain size and the handle 7 is then bored to have a hole 7a in which the stem snugly fits. After this is done, the end of stem 6 is broached by means of a special tool so as to form in said stem a multiplicity of very small longitudinally extending grooves 6e. The handle 7 is then also broached by means of a similar mating tool so that a corresponding multiplicity of grooves 7b are formed in the wall of the hole in the handle 7 and extend axially of said hole. With the handle and stem so prepared and broached, the stem 6 is then forced into the aperture in the handle. The grooves and portions therebetween in the stem and handle interlock, and a structure is provided in which the handle is permanently and securely held on the stem and frozen thereon, so to speak. In tests made with the structure, the stem has been twisted in two before the handle would turn on the stem, and once the stem is forced into the handle, it is practically impossible to separate the two. The broaching of the stem and handle described, merely forms therein, as stated, a multiplicity of five grooves and does not form accurately fitting splines or engaging members in the nature of a key and keyway. The grooves and ribs, as shown in the drawings, are, of course, exaggerated in size, as this is necessary to adequately show the same.

In operation, the valve will be operated as usual, by turning the handle 7 to move the stem and its valve portion 6a toward and from the seat 5d to close or adjust the valve. The cap 9 is tightened upon the portion 5e and the packing material 10 is greatly compressed and pressed against the stem 6 and in the groove 6c with great force. The pressure of the packing 10 into the groove 6c and against the sides thereof causes a great friction on the stem and it is impossible to move the stem the slightest amount by pressure on the end thereof. As above stated, it has not heretofore been possible to get threads such as the threads 6b, fine enough or tight enough to prevent longitudinal movement of the valve stem when pressure occurred on its outer end. This movement is indicated by the change in the flame of the gas torch after the flame has been adjusted. With the present construction of the groove and packing, this longitudinal movement of the stem is prevented, and once the valve is adjusted, its fixed position is assured.

From the above description, it is seen that applicant has provided a very simple and efficient structure of valve, particularly adapted for valves used to control gases under pressure. The structure is very simple and yet highly efficient, and results in a great improvement of the valve and a decided advance in the art. The structure is quite inexpensive and the improvement adds no extra cost to the manufacture. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A valve structure comprising a valve body having a valve seat therein, a valve stem in said body adapted to co-operate with said seat and having threaded engagement with said body to move said stem toward and from said seat, said stem having a helical groove therein with rounded ridges between its convolutions, and means engaging said stem in said groove for preventing longitudinal movement of said stem by pressure thereon.

2. A valve structure comprising a valve body having a valve seat therein, a valve stem in said body adapted to co-operate with said seat and having threaded engagement with said body to move said stem toward and from said seat, said stem having a plurality of smooth corrugations therein, packing means in said body surrounding said corrugations and means for compressing said packing about said stem and into said corrugations to prevent non-rotative longitudinal movement of said stem relative to said body by any ordinary blow or pressure on said stem.

3. A valve structure comprising a valve body having a valve seat therein, a valve stem in said body adapted to co-operate with said seat and having threaded engagement with said body to move said stem toward and from said seat, said stem having depressions therein beyond one end of its threaded portion, a body of compressible material surrounding said stem, and means for compressing said material to force the same into said depressions to prevent non-rotative longitudinal movement of said stem relatively to said body by any ordinary blow or pressure.

4. A valve structure comprising a valve stem having a seat portion at one end, a threaded portion by which it is moved toward and from the valve seat, and a corrugated portion having smooth corrugations at one end of said threaded portion, and means for pressing a packing material against said corrugations to prevent accidental longitudinal movement of said valve stem.

5. A valve structure comprising a valve body having a valve seat therein, a valve stem in said body adapted to cooperate with said seat and having threaded engagement with said body for the purpose of moving said stem toward and from said seat, said stem also having longitudinally spaced projections of greater spacing than the threads on said stem and yielding means engaging said projections to prevent non-rotative longitudinal movement of said stem relative to said body should said stem be struck a blow.

In testimony whereof I affix my signature.

LORN CAMPBELL, Jr.